United States Patent
Park et al.

(10) Patent No.: US 6,927,525 B2
(45) Date of Patent: Aug. 9, 2005

(54) UNIT CORE OF MOTOR WITH A YOKE COMPRISING AN ELONGATED END

(75) Inventors: Jin Soo Park, Inchun-si (KR); Cah Seung Jun, Seoul-si (KR); Tae Heoung Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/321,378

(22) Filed: Dec. 18, 2002

(65) Prior Publication Data

US 2004/0068856 A1 Apr. 15, 2004

(30) Foreign Application Priority Data

Oct. 10, 2002 (KR) .................................. 10-2002-0061853

(51) Int. Cl.[7] .............................................. H02K 1/12
(52) U.S. Cl. ....................... 310/259; 310/216; 310/217; 310/254; 29/598; 29/596
(58) Field of Search ................................ 310/216, 217, 310/254, 259; 29/598, 596

(56) References Cited

U.S. PATENT DOCUMENTS

| | | | | |
|---|---|---|---|---|
| 5,786,651 A | * | 7/1998 | Suzuki | .................. 310/216 |
| 5,924,186 A | * | 7/1999 | Nakagawa et al. | ............ 29/596 |
| 6,049,153 A | * | 4/2000 | Nishiyama et al. | .......... 310/259 |
| 6,219,900 B1 | * | 4/2001 | Suzuki | ....................... 29/598 |
| 6,476,533 B2 | * | 11/2002 | Akutsu et al. | ............... 310/216 |
| 6,487,769 B2 | * | 12/2002 | Ketterer et al. | ................ 29/596 |
| 6,504,284 B1 | * | 1/2003 | Kazama et al. | ............. 310/216 |
| 6,630,766 B1 | * | 10/2003 | Kim et al. | .................. 310/254 |
| 6,806,615 B2 | * | 10/2004 | Enomoto et al. | ............ 310/218 |

* cited by examiner

*Primary Examiner*—Burton S. Mullins
*Assistant Examiner*—Yahveh Comas
(74) *Attorney, Agent, or Firm*—Greenblum & Bernstein, P.L.C.

(57) ABSTRACT

Disclosed are a unit core and a method manufacturing the same. The unit core is opposite to the neighboring unit core on an electric steel plate in orientation, and its unit yoke has an elongated end extending from a central line connecting a center of a tooth to a center of a core formed by interconnecting a plurality of the unit cores, to be opposite to the elongated end of the unit yoke of the neighboring unit core in orientation. This arrangement of the unit cores on the electric steel plate reduces a size of a scrap remaining after the unit cores are punched from the electric steel plate, thereby reducing the production cost of the unit core.

4 Claims, 5 Drawing Sheets

to a unit core in which a unit yoke has an elongated end extending from a central line connecting a center of a tooth to a center of a core formed by interconnecting a plurality of the unit cores, and a method for manufacturing the unit core.

UNIT CORE OF MOTOR WITH A YOKE COMPRISING AN ELONGATED END

BACKGROUND OF THE INVENTION

1. Field of the Invention

The present invention relates to a unit core of a motor and a method for manufacturing the same, and more particularly to a unit core in which a unit yoke has an elongated end extending from a central line connecting a center of a tooth to a center of a core formed by interconnecting a plurality of the unit cores, and a method for manufacturing the unit core.

2. Description of the Related Art

As shown in FIGS. 1 and 2, a core 10 of a conventional motor comprises a ring-shaped yoke 6T and a plurality of teeth 4 regularly spaced on the yoke 6T. The teeth 4 are formed on the yoke 6T along its circumference and spaced from each other by slots 2 formed therebetween. A coil (not shown) is wound on the teeth 2. Thus, when current flows in the coil, a rotating magnetic field is generated in the core 10, thereby causing the core 10 to be magnetized.

The core 10 of the motor is manufactured by forming a unit core assembly 30 by stacking a designated number of unit cores 20, the number obtained by dividing the ring-shaped core 10 into plural equal parts so that each part occupies an angle of 360°/the number of the slots 2, to a designated height (h), and interconnecting a plurality of the unit core assemblies 30 in a circumferential direction.

Herein, each of the unit cores 20 comprises a unit yoke 6 and a tooth 4 protruding from the unit yoke 6. The unit core 12 is symmetrical on a central line ($L_1$) of connecting a center ($C_1$) of the core 10 to a center ($C_2$) of the tooth 4 of the unit core 20.

However, a plurality of the unit cores of the conventional motor are formed on an electric steel plate 25 so that one unit core 20 is opposite to a neighboring unit core 20a in orientation. Therefore, when the unit cores are made of the electric steel plate 25 by punching, a scrap 25a with a comparatively large size remains unused, thereby increasing the production cost.

SUMMARY OF THE INVENTION

Therefore, the present invention has been made in view of the above problems, and it is an object of the present invention to provide a unit core of a motor in which a unit yoke has an elongated end extending from a central line connecting a center of a tooth to a center of a core formed by interconnecting a plurality of the unit cores, and a method for manufacturing the unit core, thereby reducing a size of a scrap remaining after unit cores are punched from an electric steel plate and reducing the production cost of the unit core.

In accordance with the present invention, the above and other objects can be accomplished by the provision of a unit core of a motor comprising a unit yoke formed in a circumferential direction and a tooth radially protruding from the unit yoke, a plurality of the unit cores being interconnected so as to form a core of the motor, wherein the unit yoke has an elongated end extending from a central line connecting a center of the tooth to a center of the core toward a designated direction.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
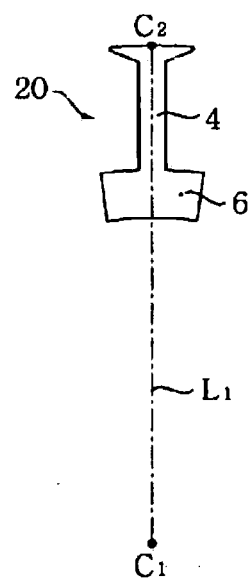
FIG. 1 is a schematic view of a unit core of a conventional motor.
Figure 2:
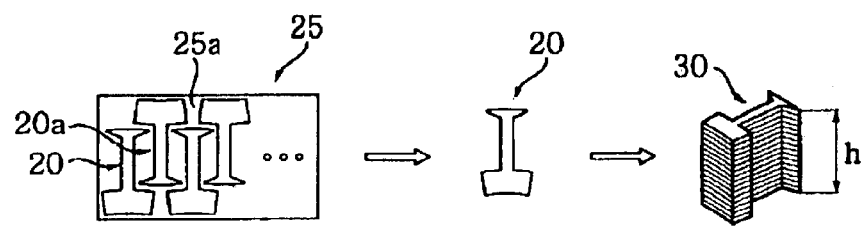
FIG. 2 is a schematic view illustrating a process for manufacturing a core of the conventional motor.
Figure 2:
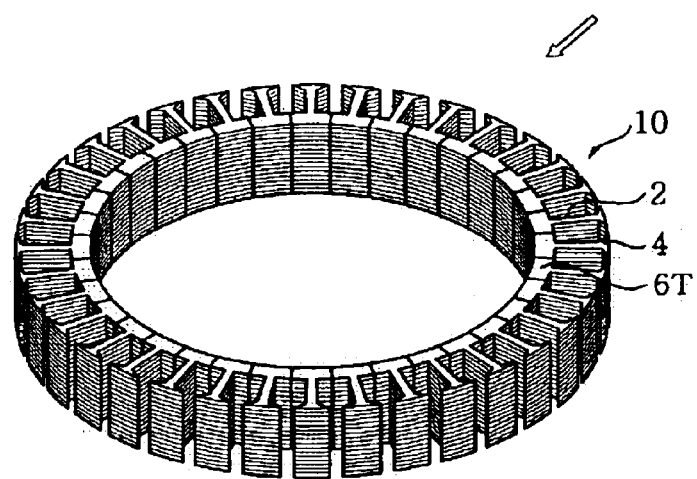
Figure 3:
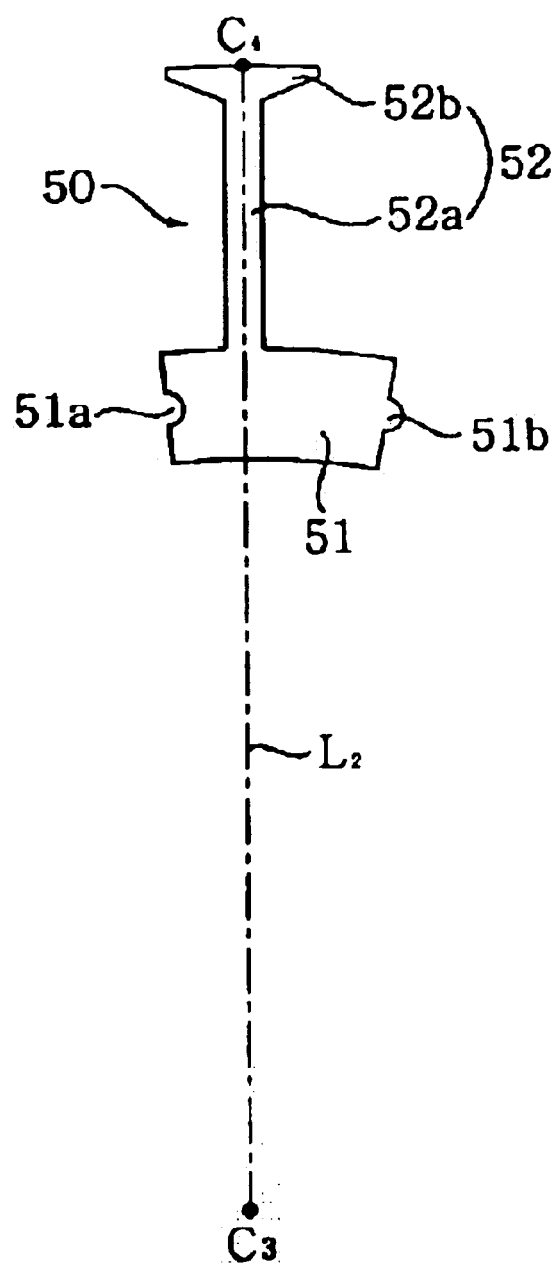
FIG. 3 is a schematic view of a unit core of a motor in accordance with the present invention.
Figure 5:
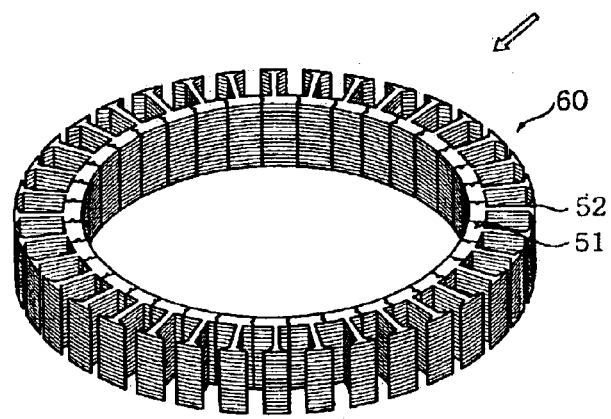
FIG. 5 is a schematic view illustrating a process for manufacturing a core of a motor in accordance with the present invention.

As shown in FIGS. 3 and 5, a lower or upper unit core 50 or 70 of the present invention comprises a unit yoke 51 or 71, and a tooth 52 or 72. A plurality of the unit cores 50 or 70 are stacked to a designated height (H), and a plurality of the stacked assemblies are interconnected along a circumferential direction, thereby forming a core 60 of a motor.

Figure 4A:
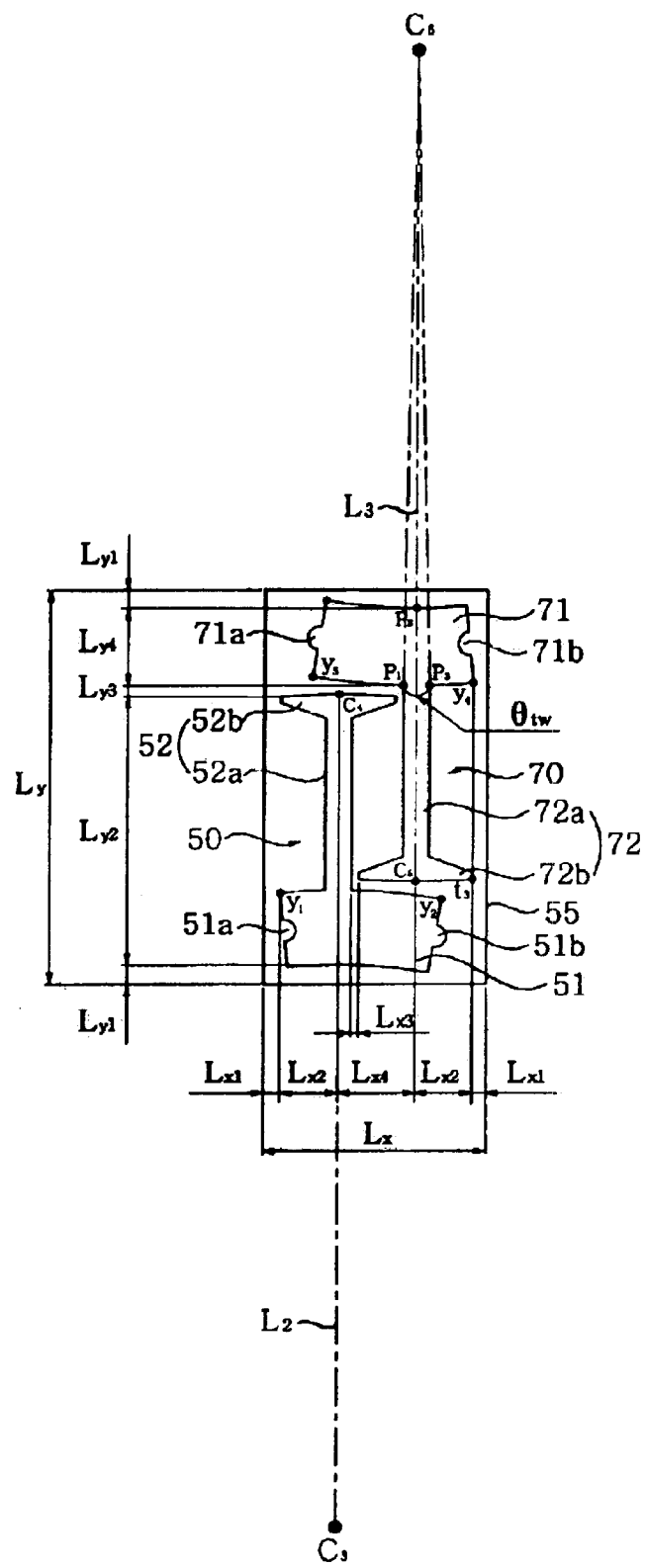
FIGS. 4a and 4b are schematic views of a pair of unit cores arranged on an electric steel plate in accordance with the present invention.
Figure 4B:
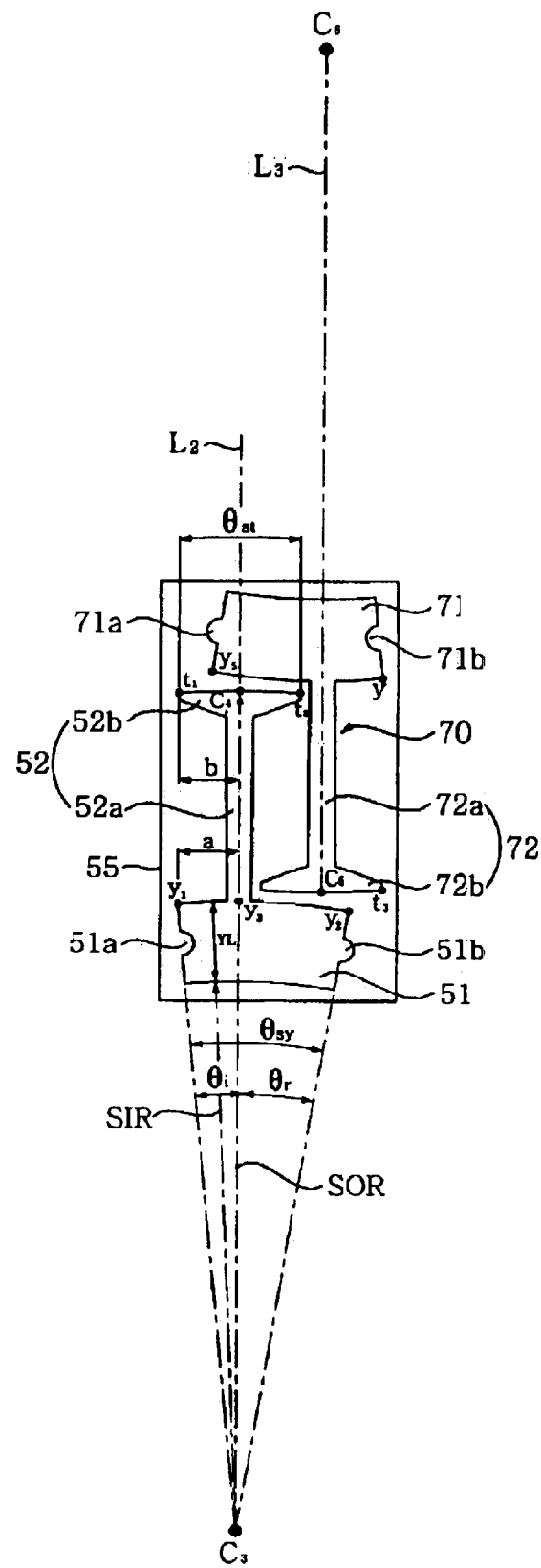

As shown in FIGS. 4a and 5, the lower and upper unit cores 50 and 70 are successively disposed on an electric steel plate 55 so that the lower unit core 50 is opposite to the upper unit core 70 in orientation. The lower unit core 50 is asymmetrical about a central line ($L_2$) of connecting a center ($C_4$) of the tooth 52 of the lower unit core 50 to a center ($C_3$) of the core 60. That is, the unit yoke 51 of the lower unit core 50 has an elongated end extending from the line ($L_2$) in a designated direction. Also, the upper unit core 70 is asymmetrical on a line ($L_3$) of connecting a center ($C_5$) of the tooth 72 of the upper unit core 70 to a center ($C_6$) of the core. That is, the unit yoke 71 of the upper unit core 70 has an elongated end extending from the line ($L_3$) in an opposite direction to the elongated end of the unit yoke 51 of the lower unit core 50. Thus, the size of the electric steel plate 55 required to manufacture a designated number of the lower and upper unit cores 50 and 70 is minimized.

That is, as viewed from the center ($C_3$) of the core 60, the right end of the unit yoke 51 of the lower unit core 50 extends to a greater length from the central line ($L_2$) than does the left end. On the other hand, as viewed from the center ($C_6$) of the core, the right end of the unit yoke 71 of the upper unit core 70 extends to a greater length from the central line ($L_3$) than does the left end.

More specifically, the dimensions of the electric steel plate 55 required to manufacture a pair of the lower and upper unit cores 50 and 70 are determined by the following equations:

$$S = L_x + L_y;$$

$$L_x = 2 \times (L_{x1} + L_{x2}) + L_{x4} = 2 \times (L_{x1} + ((SIR + YL) \times \sin \theta_i)) + L_{x4}; \text{ and}$$

$$L_y = 2 \times L_{y1} + L_{y2} + L_{y3} + L_{y4} = 2 \times L_{y1} + L_{y2} + L_{y3} + ((SIR + YL) \times \cos(\theta_{tw}/2) - SIR).$$

In the above equations, $L_{x1}$ denotes a length of a gap between one end of the unit yoke 51 of the lower unit core 50 and the end of the electric steel plate 55, or between one end of the unit yoke 71 of the upper unit core 70 and the end of the electric steel plate 55. $L_{x2}$ denotes a distance between one terminal point ($y_1$) of the unit yoke 51 of the lower unit core 50 on the non-extended side and the central line ($L_2$) of the lower unit core 50. SIR denotes an inner diameter of the core 60 obtained by interconnecting a plurality of the lower unit cores 50, and YL denotes a radial width of the unit yoke 51 of the lower unit core 50. $\theta_i$ denotes an angle from the central line ($L_2$) of the lower unit core 50 to the terminal point ($y_1$) of the unit yoke 51 of the lower unit core 50 on the non-extended side centering on the center ($C_3$) of the core 60, and $L_{x4}$ denotes a distance between the central line ($L_2$) of the lower unit core 50 and the central line ($L_3$) of the upper unit core 70.

Herein, non-described reference numeral $L_{x4}$ of FIG. 4a denotes a vertical minimum separation distance between the tooth 52 of the lower unit core 50 and the tooth 72 of the upper unit core 70.

$L_{y1}$ denotes a length of a gap between a point of a side of the unit yoke 51 on/at the lower unit core 50, and the end of the electric steel plate 55, or between a point of a side of the unit yoke 71 on/at the upper unit core 70, and the end of the electric steel plate 55. The above point on the end of the unit yoke 51 is collinear with the central line ($L_2$) of the lower unit core 50, and the above point on the end of the unit yoke 71 is collinear with the central line ($L_3$) of the upper unit core 70. $L_{y2}$ denotes a radial width of the lower unit core 50, that is, a value obtained by subtracting the inner diameter (SIR) of the core 60 from an outer diameter (SOR) of the core 60 obtained by interconnecting a plurality of the lower unit cores 50. $L_{y3}$ denotes a longitudinal minimum separation distance between the tooth 52 of the lower unit core 50 and the tooth 72 of the upper unit core 70. $L_{y4}$ denotes a distance between a contact point ($P_1$) between the unit yoke 71 and the tooth 72, and a contact point ($P_2$) between the central line ($L_3$) of the upper unit core 70 and an inner cylindrical surface of the unit yoke 71 of the upper unit core 70. $\theta_{tw}$ denotes an angle from the contact points ($P_1$) to another contact point ($P_3$) between the unit yoke 71 and the tooth 72, that is, both contact points between the unit yoke 71 and a winding part 72a of the tooth 72, centering on the center ($C_6$) of the core obtained by assembling a plurality of upper unit cores 71.

Herein, $L_{x1}$, SIR, YL, $L_{x4}$, $L_{y1}$, $L_{y2}$, $L_{y3}$, and $\theta_{tw}$ are all predetermined values in manufacturing the core 60. However, $\theta_i$ is a value obtained by subtracting an angle ($\theta_r$) from the central line ($L_2$) of the lower unit core 50 to a terminal point ($y_2$) of the unit yoke 51 of the lower unit core 50 on the extended side, from an angle ($\theta_{sy}$) between both terminal points ($y_1$, $y_2$) of the unit yoke 51 of the lower unit 50 centering on the center ($C_3$) of the core 60. Since the value of $\theta_i$ is randomly set in the range of the angle of $\theta_{sy}$, the length ($L_x$) of the electric steel plate 55 can be reduced by decreasing the value of $\theta_i$.

Herein, since the core 60 coplanarly comprises a designated number of the unit cores 50, the number obtained by dividing the core 60 into plural equal parts so that each part occupies an angle of 360°/the number of the slots, the angle of $\theta_{sy}$ is 360°/the number of the slots.

The lower and upper unit cores 50 and 70 of the present invention are designed so that one yoke of the unit yokes 51 and 71 has an elongated end extending from the central line thereof toward the other yoke of the unit yokes 51 and 71. Therefore, compared to the conventional case in which each of the unit yokes 51 and 71 of the lower and upper unit yokes 50 and 70 is symmetrical on each of the central lines ($L_2$, $L_3$) thereof, the present invention reduces a size of the electric steel plate 55 required to manufacture the lower and upper unit cores 50 and 70.

Further, the size of the electric steel plate 55 is minimized when the terminal point ($y_1$) of the unit yoke 51 of the lower unit core 50 on the non-extended side is longitudinally collinear with one terminal ($t_1$) of an enlarged part 52b of the tooth 52 on the non-extended side, and the terminal ($y_4$) of the unit yoke 71 of the upper unit core 70 on the non-extended side is longitudinally collinear with one terminal ($t_3$) of an enlarged part 72b of the tooth 72 on the non-extended side.

Therefore, preferably, the lower unit core 50 is configured so that the angle of $\theta_r$ is the maximum value of $\theta_{r,max}$ obtained when the terminal point ($y_1$) of the unit yoke 51 of the lower unit core 50 is longitudinally collinear with the terminal ($t_1$) of the enlarged part 52b of the tooth 52, and the upper unit core 70 is configured so that an angle from the central line ($L_3$) to the elongated end of the unit yoke 71 centering on the center ($C_6$) of the core obtained by interconnecting a plurality of the upper unit cores 70 is the obtained maximum angle of $\theta_{r,max}$. Herein, since the angle of $\theta_i$ is the minimum value of $\theta_{i,min}$, when the angle of $\theta_r$ is the maximum value of $\theta_{r,max}$, $\theta_{r,max}$ is determined by the following equations:

$$\theta_{r,\max} = \theta_{sy} - \theta_{i,\min} = \theta_{sy} - \sin^{-1}\left(\frac{a}{SIR+YL}\right)$$
$$= \theta_{sy} - \sin^{-1}\left(\frac{b}{SIR+YL}\right); \text{ and}$$
$$b = SOR \times \sin(\theta_{st}/2)$$

In the above equations, (a) is a length of an arc from a cross point ($y_3$) between the central line ($L_2$) of the lower unit core 50 and the outer circumference of the unit yoke 51 of the lower unit core 50 to the terminal point ($y_1$) of the unit yoke 51 of the lower unit core 50, when the terminal ($y_1$) of the unit yoke 51 of the lower unit core 50 is longitudinally collinear with the terminal ($t_1$) of the enlarged part 52b of the tooth 52. (b) is a length of an arc from the center ($C_4$) of the tooth 52 of the lower unit core 50 to the terminal ($t_1$) of the enlarged part 52b of the tooth 52 of the lower unit core 50. Since (b) has the same value as that of (a), $\theta_{r,max}$ is determined by the above equations.

Figure 6:
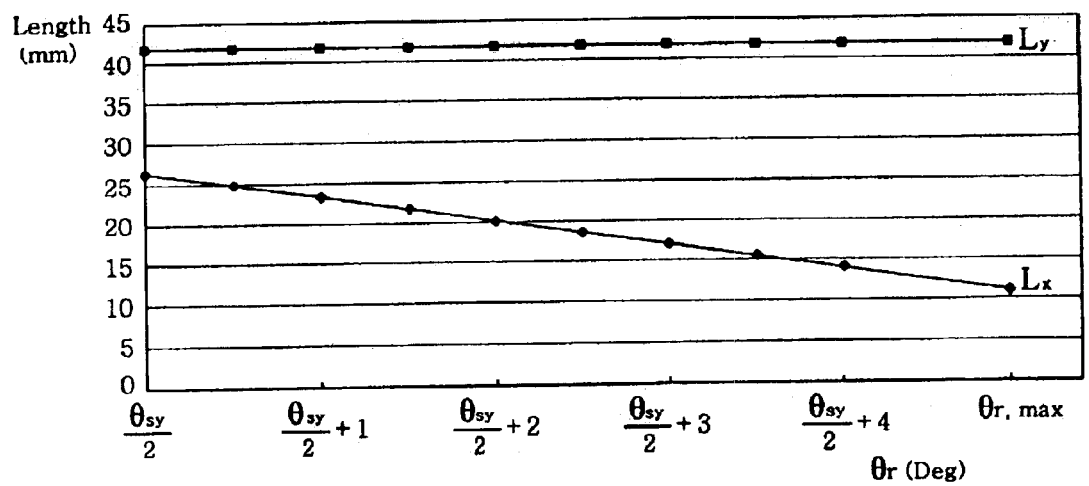
FIG. 6 is a graph showing $L_x$ and $L_y$ variations in according to $\theta_r$ variation of the present invention.

FIG. 6 is a graph showing $L_x$ and $L_y$ variations in according to Er variation of the present invention. As the elongated ends of the lower and upper yokes 51 and 71 increasingly extend from the central lines ($L_2$, $L_3$), the value of ($L_x$) is gradually decreased, but the value of ($L_y$) is not affected by the value of $\theta_r$.

Therefore, it will be appreciated that the size of the electric steel plate 55 required to manufacture the unit cores 50 and 70 is decreased, when the unit cores 50 and 70 are configured so that one yoke of the unit yokes 51 and 71 of the lower and upper unit cores 50 and 70 has an elongated end extending from each central line toward the other yoke.

Particularly, as shown in FIG. 6, the length ($L_x$) of the electric steel plate 55 is minimized when the angle of $\theta_r$ is the maximum value of $\theta_{r,max}$. Therefore, preferably, the lower and upper unit cores 50 and 70 are configured such that the angle of $\theta_r$ is the maximum value of $\theta_{r,max}$. As a result, the production cost of the electric steel plate 55 required to manufacture the unit cores 50 and 70 of the present invention is less than that of the conventional case by 15–20%.

Recesses 51a and 71a with a designated shape are individually formed on the terminals ($y_1$ and $y_4$) of the unit yokes 51 and 71 of the lower and upper unit cores 50 and 70 on the non-extended side, and protrusions 51b and 71b with a shape complementary with the corresponding recesses 51a and 71a are formed on the other terminals ($y_2$ and $y_5$) of the unit yokes 51 and 71 of the lower and upper unit cores 50 and 70 on the extended side. Herein, the protrusions 51b and 71b are protruded from the terminals ($y_2$ and $y_5$) in the circumferential direction. Therefore, when the lower and upper unit cores 50 and 70 are interconnected in the circumferential direction so as to form a core, the protrusions 51b and 71b of the unit yokes 51 and 71 of the lower and upper unit cores 50 and 70 are successively inserted into the corresponding recesses 51a and 71a of the unit yokes 51 and 71 of the neighboring lower and upper unit cores 50 and 70. Thereby, the lower and upper unit cores 50 and 70 are electrically and magnetically interconnected.

As apparent from the above description, an unit core of the present invention is opposite to a neighboring unit core in orientation and its unit yoke has an elongated end extending from a central line connecting a center of a tooth to a center of a core formed by interconnecting a plurality of the unit cores, to be opposite to the elongated end of the yoke of the neighboring unit core in orientation. Therefore, the present invention reduces a size of a scrap remaining after the unit cores are punched from an electric steel plate, thereby reducing the production cost of the unit core.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A unit core of a motor comprising a unit yoke that extends in a circumferential direction and a tooth radially protruding from the unit yoke, a plurality of said unit cores being interconnected so as to form a core of the motor, wherein the unit yoke has an elongated end extending from a central line connecting a center of the tooth to a center of the core in a predetermined direction, and a distance from a first edge of the elongated end of the yoke to said central line is greater than a distance from an opposite edge of the yoke to said center line, said edges extending transversely with respect to said predetermined direction and being adjacent to a surface of said elongated end that extends between said edges and wherein an angle from the central line, connecting the center of the tooth to the center of the core, to the elongated end has a value of $\theta_{r,max}$ determined by:

$$\theta_{r,max} = \theta_{sy} - \sin^{-1}\left(\frac{SOR \times \sin(\theta_{st}/2)}{SIR + YL}\right),$$

wherein, $\theta_{sy}$ is an angle between both terminal points of the unit yoke centering on the center of the core, SOR is an outer diameter of the core, $\theta_{st}$ is an angle between both terminals of an enlarged part of the tooth, and SIR is an inner diameter of the core, and YL is a radial width of the unit yoke.

2. The unit core of a motor as set forth in claim 1, wherein the elongated end of the unit yoke is elongated from the central line connecting the center of the tooth to the center of the core in a clockwise direction.

3. The unit core of a motor as set forth in claim 1, wherein a recess with a predetermined shape extends inwardly from the edge of one end of the unit yoke, and a protrusion with a shape complementary with the recess protrudes from the edge at the other end of the unit yoke.

4. The unit core of a motor as set forth in claim 1, wherein the elongated end of the unit yoke is elongated from the central line connecting the center of the tooth to the center of the core in a counter-clockwise direction.

* * * * *